United States Patent
Zhu (10) Patent No.: US 12,556,339 B2
(45) Date of Patent: Feb. 17, 2026

(54) CONTROL SIGNALING DETECTION METHOD, CONTROL SIGNALING DETECTION APPARATUS, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 637 days.

(21) Appl. No.: 17/908,450

(22) PCT Filed: Mar. 9, 2020

(86) PCT No.: PCT/CN2020/078441
§ 371 (c)(1),
(2) Date: Aug. 31, 2022

(87) PCT Pub. No.: WO2021/179126
PCT Pub. Date: Sep. 16, 2021

(65) Prior Publication Data
US 2023/0344597 A1    Oct. 26, 2023

(51) Int. Cl.
*H04W 24/08* (2009.01)
*H04L 5/00* (2006.01)
(Continued)

(52) U.S. Cl.
CPC ............ *H04L 5/0053* (2013.01); *H04W 8/24* (2013.01)

(58) Field of Classification Search
None
See application file for complete search history.

(56) References Cited

U.S. PATENT DOCUMENTS 10,951,359 B2 * 3/2021 Huang .................. H04W 72/23
10,985,884 B2 * 4/2021 Solano Arenas ..... H04L 5/0091
(Continued)

FOREIGN PATENT DOCUMENTS

| CN | 109391967 A | 2/2019 |
|---|---|---|
| WO | WO 2019029425 A1 | 2/2019 |
| WO | WO 2019143164 A1 | 7/2019 |
| WO | WO 2020032774 A1 | 2/2020 |

OTHER PUBLICATIONS

European Patent Office, Extended European Search Report issued in Application No. 20924100.9 dated Nov. 10, 2023, 13 pages.
(Continued)

*Primary Examiner* — Sithu Ko
(74) *Attorney, Agent, or Firm* — Finnegan, Henderson, Farabow, Garrett & Dunner, L.L.P.

(57) ABSTRACT

A method for detecting a control signaling is performed by a terminal and includes: reporting a maximum channel detection capability supported by the terminal to a network device, wherein the maximum channel detection capability is configured to determine by the network device a resource location for transmitting the control signaling; determining a detection range of the terminal at a control signaling detecting moment, wherein the detection range is determined based on the maximum channel detection capability; determining, based on the detection range, a resource range for detecting the control signaling transmitted by the network device on the resource location; and detecting within the resource range, the control signaling transmitted by the network device on the resource location.

14 Claims, 5 Drawing Sheets

(51) Int. Cl.
*H04L 27/26* (2006.01)
*H04W 8/24* (2009.01)
*H04W 72/04* (2023.01)

(56) References Cited

U.S. PATENT DOCUMENTS

| | | | | |
|---|---|---|---|---|
| 11,540,147 | B2* | 12/2022 | Zhang | H04L 5/0053 |
| 2018/0027574 | A1* | 1/2018 | Lee | H04W 48/16 370/329 |
| 2020/0068579 | A1* | 2/2020 | Hang | H04W 72/541 |
| 2020/0120708 | A1* | 4/2020 | Liu | H04W 72/0453 |
| 2020/0229270 | A1* | 7/2020 | Chatterjee | H04W 80/08 |
| 2020/0244507 | A1* | 7/2020 | Pan | H04W 72/51 |
| 2021/0028883 | A1* | 1/2021 | Wang | H04W 72/23 |
| 2021/0143937 | A1* | 5/2021 | Ma | H04W 52/0229 |
| 2021/0227511 | A1* | 7/2021 | Solano Arenas | H04L 5/0082 |
| 2021/0345308 | A1* | 11/2021 | Liu | H04W 72/23 |
| 2022/0167194 | A1* | 5/2022 | Gao | H04L 5/0053 |

OTHER PUBLICATIONS

Intel Corporation: "Remaining aspects on Rel-16 PDCCH enhancements for URLLC", 3GPP TSG RAN WG1 #100-E, R1-2000735, e-Meeting, Feb. 24-Mar. 6, 2020, 20 pages.
OPPO: "PDCCH enhancement for URLLC", 3GPP TSG RAN WG1 #96bis, R1-1904042, Xi'an, China, Apr. 8-12, 2019, 6 pages.
Examination report for India Application No. 202247055730, issued on Jan. 18, 2023, 6 pages.
International Search Report and Written Opinion for PCT Application No. PCT/CN2020/078441, issued Dec. 15, 2020.
Huawei, HiSilicon: "Discussion on PDCCH monitoring capability", 3GPP TSG RAN WG1 Meeting #97, R1-1907546, Reno, USA, May 13-17, 2019, 6 pages.
Qualcomm Incorporated: "PDCCH Enhancements for eURLLC", 3GPP TSG-RAN WG1 Meeting #97, R1-1907281, May 13-17, 2019, Reno, Nevada, U.S.A., 11 pages.

* cited by examiner

FIG. 8 ental reality (VR) and vehicle-to-vehicle communication emerged, which drives wireless communication technologies to evolve continuously to satisfy needs of applications. At present, cellular mobile communication technologies are in the evolution stage of new-generation technologies. An important feature of new-generation technologies is to support flexible configuration of multiple service types. Different service types have different requirements for wireless communication technologies, for example, enhanced mobile broad band (eMBB) service requires the large bandwidth and high speed; ultra reliable low latency communication (URLLC) service focuses on the high reliability and low latency; and massive machine type communication (mMTC) service focuses on the large number of links. Therefore, new-generation wireless communication systems require a flexible and configurable design to support transmission/reception of multiple service types.

CONTROL SIGNALING DETECTION METHOD, CONTROL SIGNALING DETECTION APPARATUS, AND STORAGE MEDIUM

CROSS-REFERENCE TO RELATED APPLICATION

This application is the national phase of International Application No. PCT/CN2020/078441, filed on Mar. 9, 2020, the content of which is hereby incorporated by reference in its entirety.

TECHNICAL FIELD

The disclosure relates to the field of communication technologies, and in particular, to a method and a device for detecting a control signaling, and a storage medium.

BACKGROUND

Higher requirements are put forward on wireless communication technologies as new Internet applications such as new-generation augmented reality (AR), new-generation virtual reality (VR) and vehicle-to-vehicle communication emerged, which drives wireless communication technologies to evolve continuously to satisfy needs of applications. At present, cellular mobile communication technologies are in the evolution stage of new-generation technologies. An important feature of new-generation technologies is to support flexible configuration of multiple service types. Different service types have different requirements for wireless communication technologies, for example, enhanced mobile broad band (eMBB) service requires the large bandwidth and high speed; ultra reliable low latency communication (URLLC) service focuses on the high reliability and low latency; and massive machine type communication (mMTC) service focuses on the large number of links. Therefore, new-generation wireless communication systems require a flexible and configurable design to support transmission/reception of multiple service types.

SUMMARY

According to a first aspect of embodiments of the disclosure, a method for detecting a control signaling is provided. The method is applicable to a terminal and includes: reporting a maximum channel detection capability supported by the terminal to a network device, in which the maximum channel detection capability is configured to determine by the network device a resource location for transmitting the control signaling; determining a detection range of the terminal at a control signaling detecting moment; in which the detection range is determined based on the maximum channel detection capability; and determining, based on the detection range; a resource range for detecting the control signaling transmitted by the network device on the resource location, and detecting within the resource range, the control signaling transmitted by the network device on the resource location.

According to a second aspect of embodiments of the disclosure, a method for detecting a control signaling is provided. The method is applicable to a network device and includes: determining a detection range of the terminal at a control signaling detecting moment based on the maximum channel detection capability supported by the terminal and determining a resource location for transmitting the control signaling based on the detection range; and transmitting the control signaling on the resource location.

According to a third aspect of embodiments of the disclosure, a device for detecting a control signaling is provided. The device includes a processor; and a memory for storing instructions executable by the processor; in which the processor is configured to perform the method for detecting a control signaling as described in the first aspect.

According to a fourth aspect of embodiments of the disclosure, a device for detecting a control signaling is provided. The device includes a processor; and a memory for storing instructions executable by the processor; in which the processor is configured to perform the method for detecting a control signaling as described in the second aspect.

According to a fifth aspect of embodiments of the disclosure, a non-transitory computer-readable storage medium is provided. The non-transitory computer-readable storage medium has stored therein instructions that, when executed by a processor of a mobile terminal, cause the mobile terminal to perform the method for detecting a control signaling as described in the first aspect.

According to a sixth aspect of embodiments of the disclosure, a non-transitory computer-readable storage medium is provided. The non-transitory computer-readable storage medium has stored therein instructions that, when executed by a processor of a mobile terminal, cause the mobile terminal to perform the method for detecting a control signaling as described in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

Figure 1:
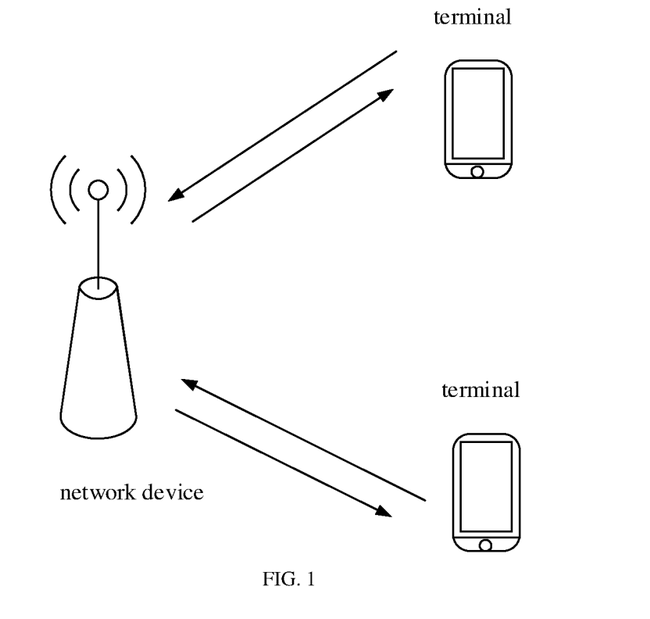
FIG. 1 is a schematic diagram illustrating a wireless communication system according to some embodiments.

The method provided in some embodiments of the disclosure can be applied to a wireless communication system in FIG. 1. Referring to FIG. 1, the wireless communication system includes network devices and terminals. The terminal is connected to the network device and performs data transmission/reception through wireless resources.

It should be understood that the wireless communication system in FIG. 1 is only for schematic illustration, and the wireless communication system may also include other network devices, such as core network devices, wireless relay devices and wireless backhaul devices, which are not illustrated in FIG. 1. Some embodiments of the disclosure do not limit the number of network devices and the number of terminals in the wireless communication system.

It should be further understood that the wireless communication system in some embodiments of the disclosure is a network that provides wireless communication functions. The wireless communication system can use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to different network capacities, speeds, delays and other factors, the network can be divided into 2G (generation) network, 3G network, 4G network or future evolution network such as 5G network. The 5G network can also be called a new radio network (NR). For the convenience of description, the wireless communication network is sometimes referred to as the network in this disclosure.

Further, the network device involved in the disclosure may also be referred to as a wireless access network device. The wireless access network device may be a base station, an evolved base station (evolved node B), a home base station, an access point (AP) in a wireless fidelity (WIFI) system, a wireless relay node, a wireless backhaul node, a transmission point (TP), a transmission and reception point (TRP) or the like. The wireless access network device can also be a gNB in the NR system or can also be a component or part of the device constituting the base station. It should be understood that, in embodiments of the disclosure, the specific technology and specific device form adopted by the network device are not limited. In the disclosure, the network device can provide the communication coverage for a specific geographic area and can communicate with a terminal located in the coverage area (cell). In addition, when it is a vehicle-to-vehicle (V2X) communication system, the network device may also be a vehicle-mounted device.

Further, the terminal involved in the disclosure may also be called a terminal device, user equipment (UE), a mobile station (MS), a mobile terminal (MT), or the like, which is a device that provides voice and/or data connectivity. For example, the terminal may be a handheld device, a vehicle-mounted device or the like with a wireless connection function. At present, some examples of terminals are smart phones (mobile phones), pocket personal computers (PPCs), handheld computers, personal digital assistants (PDAs), notebook computers, tablet computers, wearable devices, vehicle-mounted device or the like. In addition, when it is a vehicle-to-vehicle (V2X) communication system, the terminal device may also be a vehicle-mounted device. It should be understood that embodiments of the disclosure do not limit the specific technology and specific device form adopted by the terminal.

In the related art, the terminal needs to obtain configuration information through a high-level signaling transmitted by the network device, and detects a control signaling in a time domain and in a frequency domain based on the configuration information. The terminal needs to obtain a channel state before detecting the control signaling. The channel state can be obtained by measuring on pilot information carried in a resource range to be detected only. Presently, a resource granularity of the channel detection is based on a bundle of resource groups (REGs) as a unit.

In some application scenarios, there may be a large number of connected terminals in the system but some terminals among these connected terminals may have weaker capabilities. The channel detection range will affect the detection complexity of the terminal during detecting the control signaling. However, the design of the control signaling in the conventional method for detecting the control signaling does not consider the existence of terminals with weaker capabilities, resulting in that some terminals with weaker capabilities may not perform the conventional method for detecting the control signaling.

In view of this, some embodiments of the disclosure provide a method for detecting a control signaling, in which the detection range of the terminal at the control signaling detecting moment is determined based on the maximum channel detection capability supported by the terminal, which further supports the adjustment of transmission/reception resources of the control signaling according to the terminal channel detection capability. The resource range for detecting the control signaling is determined based on the detection range that is determined, and the control signaling is detected within the resource range, so as to reduce the complexity of performing the channel detection when detecting the control signaling.

Figure 2:
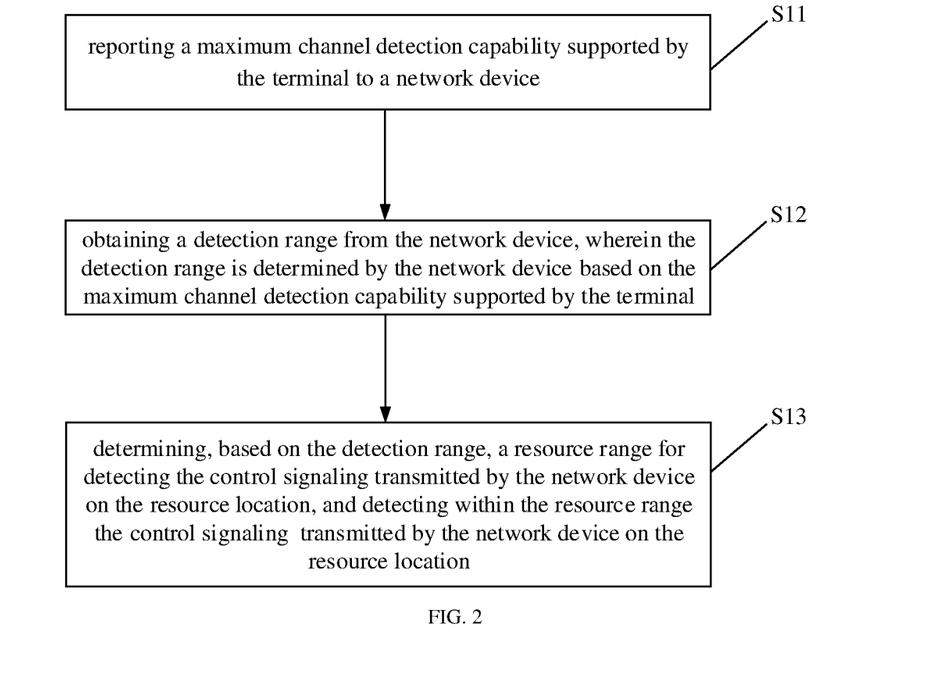
FIG. 2 is a flow chart illustrating a method for detecting a control signaling according to some embodiments.

FIG. 2 is a flow chart illustrating a method for detecting a control signaling according to some embodiments. As illustrated in FIG. 2, the method for detecting a control signaling is applicable to a terminal and includes the following steps S11 and S12.

In S11, a maximum channel detection capability supported by the terminal is reported to a network device.

The maximum channel detection capability reported by the terminal is configured to determine by the network device a detection range of the terminal at a control signaling detecting moment and determine by the network device a resource location for transmitting the control signaling.

The terminal may report the maximum channel detection capability based on pre-configured uplink resources.

In S12, a detection range of the terminal at a control signaling detecting moment is determined, in which the detection range is determined based on the maximum channel detection capability supported by the terminal.

In S13, a resource range for detecting the control signaling transmitted by the network device on the resource location, is determined based on the detection range, and the control signaling transmitted by the network device on the resource location is detected within the determined resource range.

In some embodiments of the disclosure, the maximum channel detection capability supported by the terminal may take the number of frequency domain resources as the unit, such as a set of control resource elements (CCEs).

According to some embodiments of the disclosure, in an implementation manner, the maximum channel detection capability includes a maximum channel detection capability supported by the terminal at a single control signaling detecting moment. For example, the maximum channel detection capability supported by the terminal at the single control signaling detecting moment is 8 CCEs, which means that the terminal can perform the channel detection on a maximum of 8 CCEs at this control signaling detecting moment.

In another implementation manner, the maximum channel detection capability includes a maximum channel detection capability supported by the terminal within a control signaling detecting duration. The control signaling detecting duration may be a predefined duration. The control signaling detecting duration may be an absolute duration, such as 1 s, 1 ms, and so on. The control signaling detecting duration can also be a logical time concept, such as 1 slot, 5 subframes, and so on. For example, the maximum channel detection capability is [1 slot, 8 CCEs], which means that the terminal can support the channel detection on up to 8 CCEs when detecting the control signaling in 1 slot.

In another implementation manner, the maximum channel detection capability includes a maximum channel detection capability supported by the terminal at a single control signaling detecting moment and a maximum channel detection capability supported by the terminal within a control signaling detecting duration. For example, if the maximum channel detection capability is [1 slot, 8 CCEs] and the maximum channel detection capability at the single control signaling detecting moment is 4 CCEs, the terminal can perform the channel detection on most 4 CCEs at one control signaling detecting moment and the performed channel detection in multiple detection of control signaling in 1 slot does not exceed 8 CCEs.

In some embodiments of the disclosure, when determining the detection range of the terminal at the control signaling detecting moment, the following manners may be used.

In an implementation manner, if the maximum channel detection capability includes the maximum channel detection capability supported by the terminal at the control signaling detecting moment, the detection range of the terminal at each control signaling detecting moment can be determined, and the detection range of the terminal at each control signaling detecting moment is less than or equal to the maximum channel detection capability supported by the terminal at the single control signaling detecting moment.

In another implementation manner, if the maximum channel detection capability includes the maximum channel detection capability supported by the terminal within the control signaling detecting duration, and the terminal is configured to perform the control signaling detection at one or more control signaling detecting moments, the detection range at each control signaling detecting moment within the control signaling detecting duration may be determined. A total detection range of the terminal at the one or more control signaling detecting moments is less than or equal to the maximum channel detection capability supported by the terminal within the control signaling detecting duration.

If the control signaling detecting duration includes a plurality of control signaling detecting moments, the detection range at each control signaling detecting moment in the plurality of control signaling detecting moments is the same or different. For example, the maximum channel detection capability supported by the terminal is [1 slot, 8 CCEs]. It is assumed that the terminal is configured to perform the control signaling detection at 2 detection moments in 1 slot, then the channel detection capabilities at detection moment 1 and detection moment 2 can be the same (both 4 CCEs) or different (detection moment 1 is 2 CCEs and detection moment 2 is 6 CCEs).

In another implementation manner, if the maximum channel detection capability includes the maximum channel detection capability supported by the terminal at the single control signaling detecting moment and the maximum channel detection capability supported by the terminal within the control signaling detecting duration, the detection range of the terminal at each control signaling detecting moment is determined and the detection range of the terminal at each control signaling detecting moment within the control signaling detecting duration may be determined, so that the detection range of the terminal at the control signaling detecting moment is less than or equal to the maximum channel detection capability supported by the terminal at the single control signaling detecting, and the total detection range of the terminal within the control signaling detecting duration is less than or equal to the maximum channel detection capability supported by the terminal within the control signaling detecting duration. For example, if the maximum channel detection capability [1 slot, 8 CCEs] and the maximum channel detection capability at the single control signaling detecting moment is 4 CCEs, the terminal can perform the channel detection within at most 4 CCEs at the one control signaling detecting moment, and the channel detection performed during multiple detection of the control signaling in 1 slot does not exceed 8 CCEs.

During the above-mentioned implementation process of determining the detection range of the terminal at the control signaling detecting moment in some embodiments of the disclosure, in an implementation, the terminal determines the detection range of the terminal at the control signaling detecting moment based on the maximum channel detection capability supported by the terminal. Hereinafter, it is referred to as the first detection range. After determining the first detection range, the terminal determines the first detection range as the detection range of the terminal at the control signaling detecting moment, and detects the control signaling on resources that do not exceed the determined first detection range.

In some embodiments of the disclosure, in the case that the terminal determines the detection range of the terminal at the control signaling detecting moment based on the maximum channel detection capability supported by the terminal, the maximum channel detection capability is reported by the terminal to the network device, so that the network device may use it to determine the resource location for transmitting the control signaling based on the maximum channel detection capability supported by the terminal. The network device obtains the maximum channel detection capability reported by the terminal, determines the resource location for transmitting the control signaling based on the maximum channel detection capability supported by the terminal, and transmits the control signaling at the determined resource location.

In another implementation manner, in some embodiment of the disclosure, the network device may determine the detection range of the terminal at the control signaling detecting moment based on the maximum channel detection capability supported by the terminal, or the network device may learn the first detection range determined by the terminal based on the maximum detection capability reported by the terminal and determine whether to configure resources according to the first detection range. When the network device determines that the resource is not configured according to the first detection range determined by the terminal, the network device may re-determine the detection range. In some embodiments of the disclosure, the detection range determined by the network device is referred to as the second detection range in the following.

Figure 3:
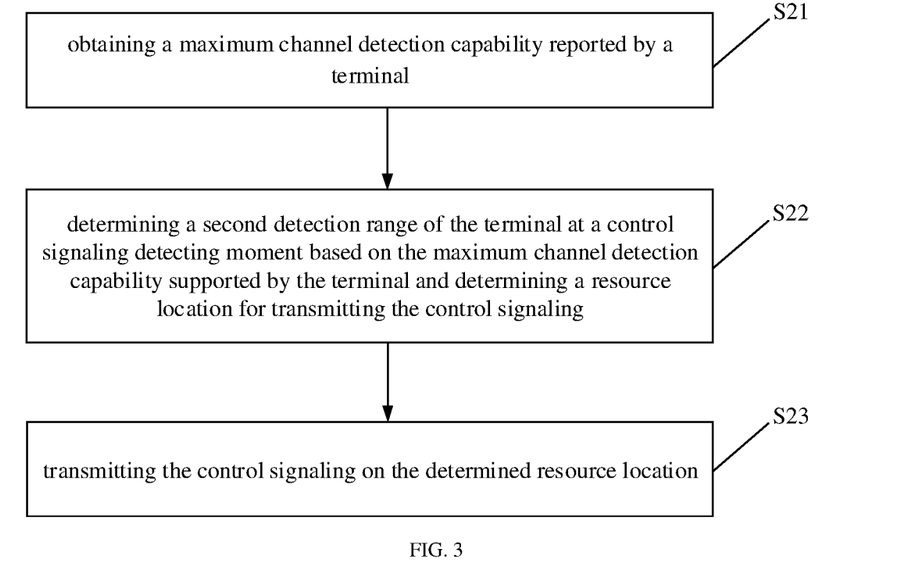
FIG. 3 is a flow chart illustrating a method for detecting a control signaling according to some embodiments.

FIG. 3 is a flow chart illustrating a method for detecting a control signaling according to some embodiments. As illustrated in FIG. 3, the method for detecting a control signaling is applicable to a network device and includes the following steps S21 to S23.

In 21, a maximum channel detection capability reported by a terminal is obtained.

The maximum channel detection capability reported by the terminal is configured to determine by the network device a detection range of the terminal at a control signaling detecting moment and determine by the network device a resource location for transmitting the control signaling.

The network device may obtain the maximum channel detection capability reported by the terminal on resources pre-configured for the terminal.

In S22, a second detection range of the terminal at a control signaling detecting moment is determined based on the maximum channel detection capability supported by the terminal, and a resource location for transmitting the control signaling is determined based on the second detection range. For the implementation process of the network device determining the second detection range based on the maximum channel detection capability supported by the terminal, reference should be made to the related description of determining the detection range based on the maximum channel detection capability in the foregoing embodiments, which will not be repeated herein.

When the network device determines the resource location for transmitting the control signaling based on the maximum channel detection capability supported by the terminal, it can determine a resource starting position and a resource range for transmitting the control signaling. The resource starting position range for transmitting the control signaling may be related to a time domain resource position at the detection moment, the terminal ID, the cell ID and other parameters. That is, the starting position is determined based on a predefined manner. The resource range for transmitting control signaling is determined according to the maximum channel detection capability.

In S23, the control signaling is transmitted at the determined resource location.

The network device may transmit the second detection range based on a radio resource control (RRC) signaling, a media access control (MAC) control element (CE) signaling, or a physical layer signaling. The terminal may receive the second detection range based on the RRC signaling, the MAC CE signaling, or the physical layer signaling.

In some embodiment of the disclosure, in the case that the terminal determines the first detection range based on the maximum channel detection capability, the terminal reports the maximum channel detection capability to the network device, and the network device can learn the first detection range determined by the terminal according to the maximum channel detection capability reported by the terminal, and determine whether to configure resources according to the first detection range determined by the terminal. When the network device determines that the resources are not configured according to the first detection range determined by the terminal, the network device may re-determine the detection range and transmit the re-determined detection range to the terminal.

In some embodiment of the disclosure, when the terminal determines the detection range, the terminal reports the maximum channel detection capability. On one hand, the network device can determine the resource location for transmitting the control signaling based on the maximum channel detection capability supported by the terminal. On the other hand, the network device determines the second detection range based on the maximum channel detection capability supported by the terminal. When the network device determines the second detection range, the terminal and the network device can reasonably determine the detection range of the control signaling. For example, the maximum channel detection capability reported by the terminal is to detect 8 CCEs at most and the network device determines not to use a control signaling with an aggregation level of 16 for transmission. Or, for example, the maximum channel detection capability reported by the terminal is to detect 8 CCEs at most, and the network device determines that the control signaling for the terminal should be transmitted on the resource to be detected determined by the terminal.

In some embodiments of the disclosure, after the network device determines the second detection range based on the maximum channel detection capability supported by the terminal, the network device transmits the determined second detection range to the terminal, and the terminal obtains the second detection range transmitted by the network device, and sets the second detection range as the detection range of the terminal at the control signaling detecting moment and the control signaling is detected on resources that do not exceed the detection range transmitted by the network device. In other words, the method for detecting a control signaling provided by embodiments of the disclosure, on the basis of the method in FIG. 3, further includes the following step: transmitting the determined second detection range to the terminal.

In some embodiments of the disclosure, after the terminal determines the detection range, it can determine the resource range for detecting the control signaling based on the detection range. The terminal needs to determine the resource range for detecting the control signaling at each control signaling detecting moment. In an implementation manner, the terminal may determine the resource range for detecting the control signaling based on the starting position of the resource range and the detection range. The determination of the starting position of the resource range in some embodiments of the disclosure may be related to the time domain resource position at the detection moment, the terminal ID, cell ID and other parameters. That is, the starting position is determined based on a predefined manner.

In some embodiments of the disclosure, the network device transmits the control signaling at some or all of the determined resource positions, and the terminal performs blind detection of the control signaling within the determined resource range.

In some embodiments of the disclosure, the terminal blindly detects the control signaling on the resources within the determined detection range. Since the control signaling may support multiple aggregation levels, and the number of detections required at each control signaling detecting moment is pre-configured, after determining the resource range for control signaling detecting, it is also necessary to determine the detection positions of the control signalings of different aggregation levels.

Figure 4:
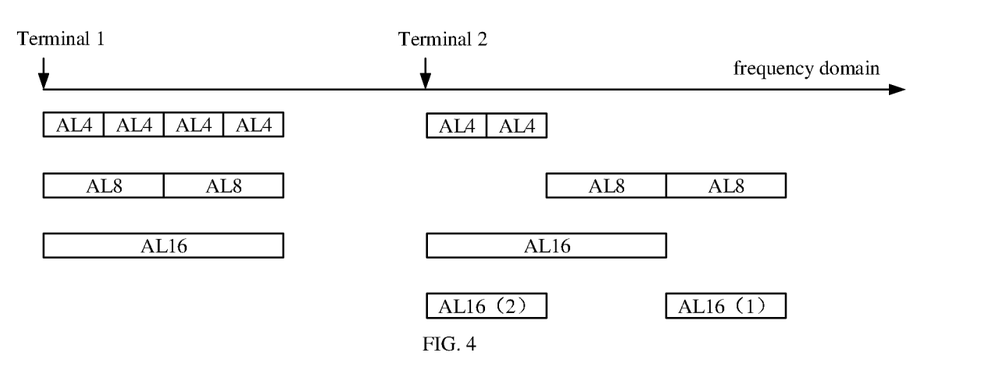
FIG. 4 is a schematic diagram illustrating a resource range determination according to some embodiments.

In an example, as illustrated in FIG. 4, the detection range of the terminal 1 at a certain detection moment is 16 CCEs, and the configured aggregation level (AL) of control signaling detecting is 4 (4 detections). 8 (2 detections) and 16 (1 detection). The control signaling detecting range of terminal 2 at this moment is 24 CCEs, and the configured aggregation level (AL) of control signaling detecting is 4 (2 detections), 8 (2 detections) and 16 (2 detections). Terminal 1 and terminal 2 respectively determine the starting position of the detection range according to a predefined manner, and then determine the detection range of the control signaling according to the detection range, and the terminals perform blind detection of channel and control signaling within the determined detection range.

It can be understood that the method provided by embodiments of the disclosure may be applicable to the interaction process between the network device and the terminal. For the execution operation process of the terminal and the network device involved in the interaction process, reference should be made to the relevant description of the foregoing embodiments, which will not be repeated herein.

With the method for detecting a control signaling provided by embodiments of the disclosure, the detection range of the terminal at the control signaling detecting moment is determined based on the maximum channel detection capability supported by the terminal, and the resource location for transmitting the control signaling is determined based on the maximum channel detection capability, which can support the adjustment of transmission/reception resources of the control signaling according to the terminal channel detection capability for the network device or the terminal. The resource range for detecting the control signaling is determined by the terminal based on the determined detection range, and the control signaling is detected within the resource range, so as to reduce the complexity of performing by the terminal the channel detection when detecting the control signaling.

Based on the same concept, embodiments of the disclosure also provide an apparatus for detecting a control signaling.

It can be understood that, in order to implement the above-mentioned functions, the apparatus for detecting a control signaling provided in embodiments of the disclosure includes hardware structures and/or software modules corresponding to various functions. In combination with units and algorithm steps of examples disclosed in embodiments of the disclosure, embodiments of the disclosure can be implemented in the form of hardware or a combination of hardware and computer software. Whether a certain function is executed by hardware or software-driven hardware depends on specific applications and design constraint conditions of technical solutions. Those skilled in the art can use different manners for each specific application to implement the described functions, but such implementation should not be considered as going beyond the scope of technical solutions of embodiments of the disclosure.

Figure 5:
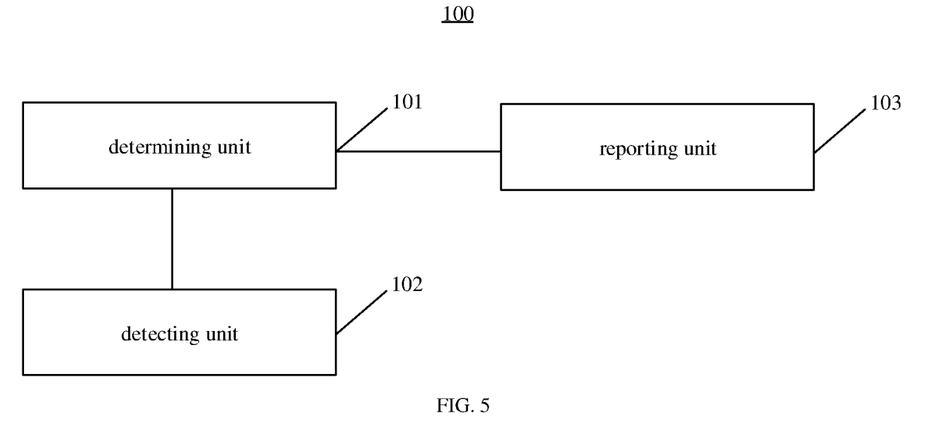
FIG. 5 is a block diagram illustrating an apparatus for detecting a control signaling according to some embodiments.

FIG. 5 is a block diagram illustrating an apparatus for detecting a control signaling according to some embodiments. Referring to FIG. 5, the apparatus 100 for detecting a control signaling is applicable to a terminal, and includes a determining unit 101, a detecting unit 102 and a reporting unit 103.

The reporting unit 103 is configured to report a maximum channel detection capability supported by the terminal to a network device, in which the maximum channel detection capability is configured to determine by the network device a resource location for transmitting the control signaling. The determining unit 101 is configured to determine a detection range of the terminal at a control signaling detecting moment, in which the detection range is determined based on the maximum channel detection capability, and determine, based on the detection range, a resource range for detecting the control signaling transmitted by the network device on the resource location. The detecting unit 102 is configured to detect within the resource range the control signaling transmitted by the network device on the resource location.

In an implementation, the maximum channel detection capability includes a maximum channel detection capability supported by the terminal at a single control signaling detecting moment; and the detection range of the terminal at the control signaling detecting moment is less than or equal to the maximum channel detection capability supported by the terminal at the single control signaling detecting moment.

In an implementation, the maximum channel detection capability includes a maximum channel detection capability supported by the terminal within a control signaling detecting duration; and the control signaling detecting duration includes one or more control signaling detecting moments, and a total detection range of the terminal at the one or more control signaling detecting moments is less than or equal to the maximum channel detection capability supported by the terminal within the control signaling detecting duration.

In an implementation, the control signaling detecting duration includes a plurality of control signaling detecting moments; and detection ranges at respective control signaling detecting moments of the plurality of control signaling detecting moments are the same or different.

In an implementation, the maximum channel detection capability includes a maximum channel detection capability supported by the terminal at a single control signaling detecting moment and the maximum channel detection capability includes a maximum channel detection capability supported by the terminal within a control signaling detecting duration; and the detection range of the terminal at the control signaling detecting moment is less than or equal to the maximum channel detection capability supported by the terminal at the single control signaling detecting moment and a total detection range of the terminal within the control signaling detecting duration is less than or equal to the maximum channel detection capability supported by the terminal within the control signaling detecting duration.

In an implementation, the determining unit 101 is configured to determine the detection range of the terminal at the control signaling detecting moment by an act of determining a first detection range that is determined by the terminal based on the maximum channel detection capability as the detection range of the terminal at the control signaling detecting moment.

In an implementation, the determining unit is configured to determine the detection range of the terminal at the control signaling detecting moment by an act of: obtaining a second detection range from the network device, and determining the second detection range as the detection range of the terminal at the control signaling detecting moment; in which the second detection range is determined by the network device based on the maximum channel detection capability supported by the terminal.

In an implementation, the determining unit 101 is configured to determine, based on the detection range, the resource range for detecting the control signaling transmitted by the network device on the resource location, by an act of: determining the resource range for detecting the control signaling based on a starting position of the resource range and the detection range.

In an implementation, the starting position is determined based on pre-configured information, or the starting position is determined based on a time-frequency resource position at the control signaling detecting moment, a terminal ID and a cell ID.

In an implementation, obtaining the second detection range from the network device includes: obtaining the second detection range from the network device based on a radio resource control signaling, a media access control signaling or a physical layer signaling.

Figure 6:
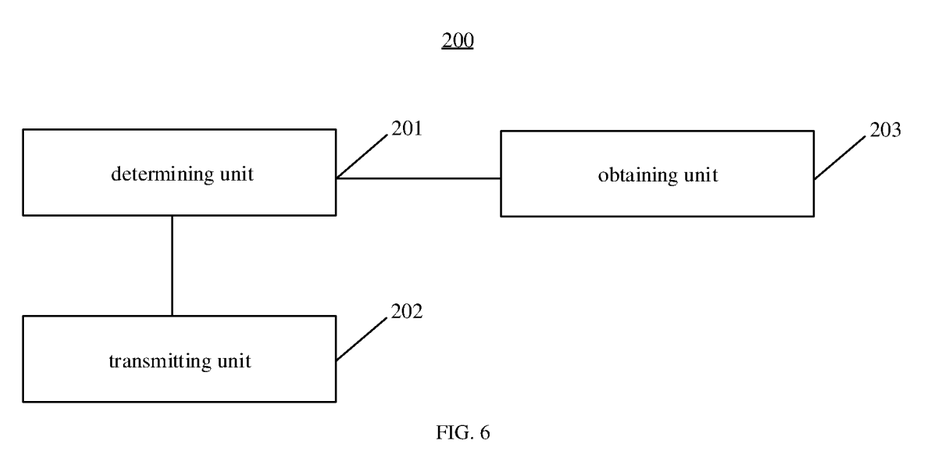
FIG. 6 is a block diagram illustrating an apparatus for detecting a control signaling according to some embodiments.

FIG. 6 is a block diagram illustrating an apparatus for detecting a control signaling according to some embodiments. Referring to FIG. 6; the apparatus 200 is applicable to a network device and includes a determining unit 201, a transmitting unit 202 and an obtaining unit 203.

The obtaining unit 203 is configured to obtain a maximum channel detection capability supported by a terminal and reported by the terminal. The determining unit 201 is configured to determine a detection range of the terminal at a control signaling detecting moment based on the maximum channel detection capability supported by the terminal and determine a resource location for transmitting the control signaling based on the detection range. The transmitting unit 202 is configured to transmit the control signaling on the resource location.

In an implementation, the transmitting unit 202 is further configured to transmit the determined detection range to the terminal.

In an implementation, the maximum channel detection capability includes a maximum channel detection capability supported by the terminal at a single control signaling detecting moment; and the detection range of the terminal at the control signaling detecting moment is less than or equal to the maximum channel detection capability supported by the terminal at the single control signaling detecting moment.

In an implementation, the maximum channel detection capability includes a maximum channel detection capability supported by the terminal within a control signaling detecting duration; and the control signaling detecting duration includes one or more control signaling detecting moments, and a total detection range of the terminal at the one or more control signaling detecting moments is less than or equal to the maximum channel detection capability supported by the terminal within the control signaling detecting duration.

In an implementation, the control signaling detecting duration includes a plurality of control signaling detecting moments; and detection ranges at respective control signal detecting moments of the plurality of control signaling detecting moments are the same or different.

In an implementation, the maximum channel detection capability includes a maximum channel detection capability supported by the terminal at a single control signaling detecting moment and the maximum channel detection capability includes a maximum channel detection capability supported by the terminal within a control signaling detecting duration; and the detection range of the terminal at the control signaling detecting moment is less than or equal to the maximum channel detection capability supported by the terminal at the single control signaling detecting moment and a total detection range of the terminal within the control signaling detecting duration is less than or equal to the maximum channel detection capability supported by the terminal within the control signaling detecting duration.

In an implementation, the apparatus further includes the obtaining unit 203 configured to obtain the maximum channel detection capability reported by the terminal.

In an implementation, the transmitting unit is configured to transmit the detection range based on a radio resource control signaling, a media access control signaling or a physical layer signaling.

With respect to the apparatuses in the above embodiments, the specific manners for performing operations for individual modules therein have been described in detail in the embodiments regarding the methods, which will not be elaborated herein.

Figure 7:
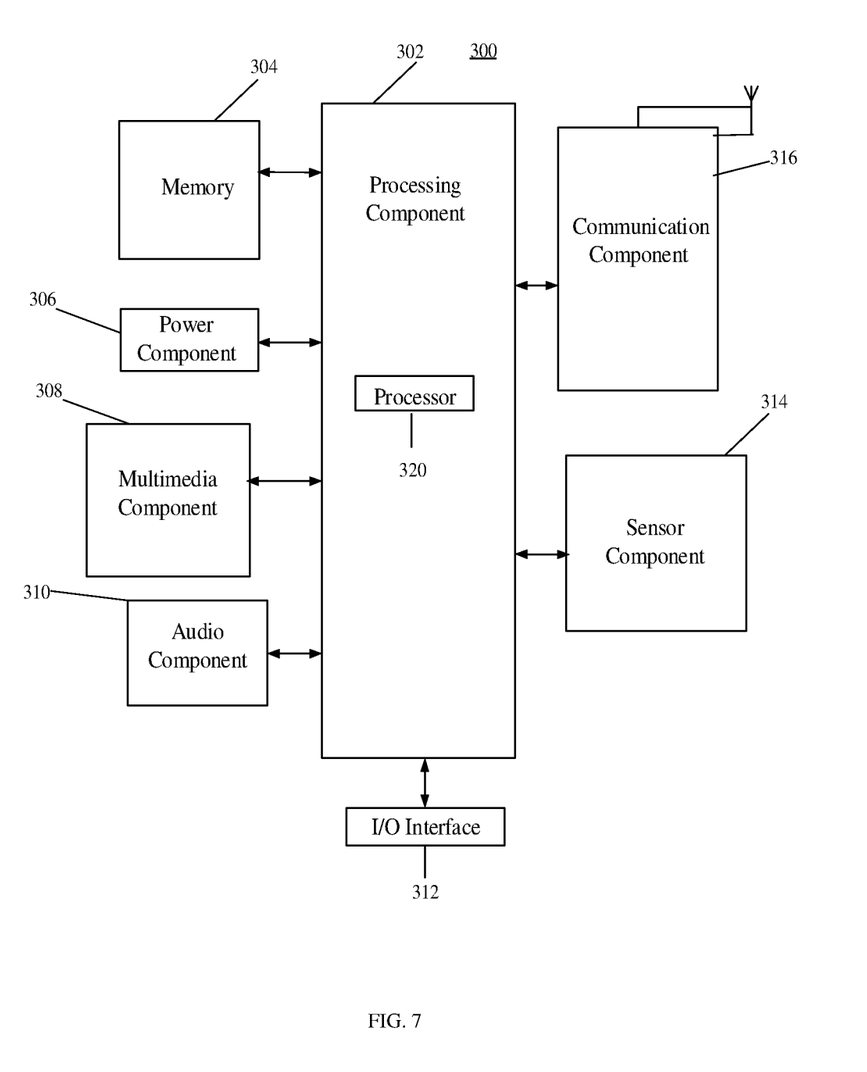
FIG. 7 is a block diagram illustrating a device according to some embodiments.

FIG. 7 is a block diagram illustrating a device 300 for detecting a control signaling according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 7, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G or 3G, or a combination thereof. In one embodiment, the communication component 316 receives a broadcast signal or broadcast associated information from an external broadcast management system via a broadcast channel. In one embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 8:
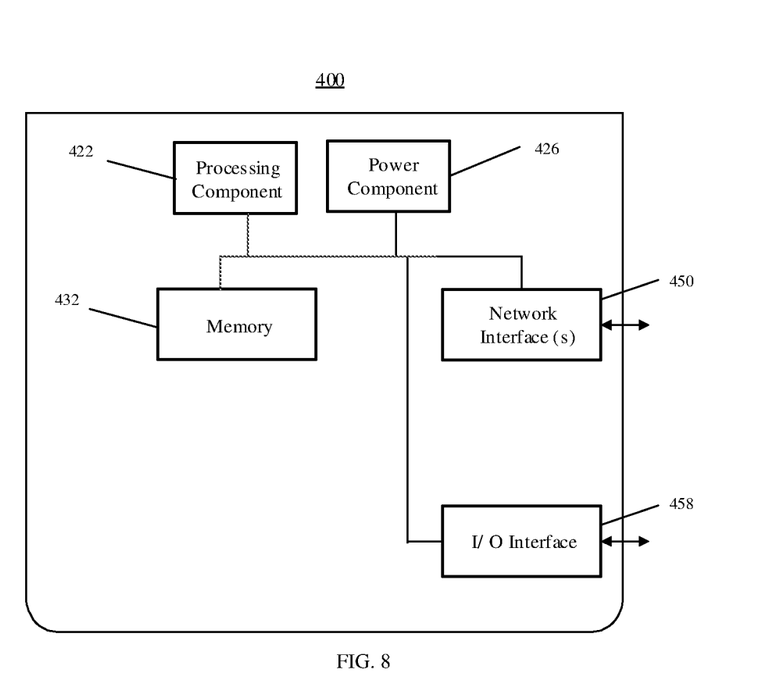
FIG. 8 is a block diagram illustrating a device according to some embodiments.

FIG. 8 is a block diagram illustrating a device 400 for detecting a control signaling according to some embodiments. For example, the device 400 may be provided as a network device, such as a base station or the like. Referring to FIG. 8, the device 400 includes a processing component 422 that further includes one or more processors, and a memory resource represented by a memory 432 for storing instructions that can be executed by the processing component 422 such as application programs. The application program stored in the memory 432 may include one or more modules each corresponding to a set of instructions. In addition, the processing component 422 is configured to execute instructions to perform the above-mentioned methods.

The device 400 may also include a power component 426 configured to perform power management of the device 400, a wired or wireless network interface 450 configured to connect the device 400 to a network, and an input output (I/O) interface 458. The device 400 can operate based on an operating system stored in the memory 432, such as Windows Server™, Mac OS X™, Unix™, Linux™, FreeBSD™ or the like.

In some embodiments, there is also provided a non-transitory computer readable storage medium including instructions, such as included in the memory 432, executable by the processor 422 in the device 400, for performing the above-described methods. For example, the non-transitory computer-readable storage medium may be a ROM, a RAM, a CD-ROM, a magnetic tape, a floppy disc, an optical data storage device, and the like.

It should be understood that "several" mentioned in the disclosure may refer to one or more, and "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information nay also he referred to as first information.

It can be further understood that although the operations in the embodiments of the disclosure are described in a specific order in the drawings, they should not be understood as requiring these operations to be performed in the specific order or in the serial order, or requiring perform all the operations to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only he limited by the appended claims.

The invention claimed is:

1. A method for detecting a control signaling, performed by a terminal, comprising:
   reporting a maximum channel detection capability supported by the terminal to a network device, wherein the maximum channel detection capability is configured to determine by the network device a resource location for transmitting the control signaling;
   determining a detection range of the terminal at a control signaling detecting moment, wherein the detection range is determined based on the maximum channel detection capability;
   determining, based on the detection range, a resource range for detecting the control signaling transmitted by the network device on the resource location; and
   detecting within the resource range, the control signaling transmitted by the network device on the resource location;
   wherein the maximum channel detection capability comprises the maximum channel detection capability supported by the terminal within a control signaling detecting duration; and the control signaling detecting duration comprises one or more control signaling detecting moments, and a total detection range of the terminal at the one or more control signaling detecting moments is less than the maximum channel detection capability supported by the terminal within the control signaling detecting duration;
   wherein determining the detection range of the terminal at the control signaling detecting moment comprises:
   determining the detection range determined by the terminal based on the maximum channel detection capability as the detection range of the terminal at the control signaling detecting moment.

2. The method of claim 1, wherein the maximum channel detection capability comprises the maximum channel detection capability supported by the terminal at a single control signaling detecting moment; and
   the detection range of the terminal at the control signaling detecting moment is less than or equal to the maximum channel detection capability supported by the terminal at the single control signaling detecting moment.

3. The method of claim 1, wherein the control signaling detecting duration comprises a plurality of control signaling detecting moments; and
   detection ranges at respective control signal detecting moments of the plurality of control signaling detecting moments are the same or different.

4. The method of claim 1, wherein determining the detection range of the terminal at the control signaling detecting moment comprises:
   obtaining a detection range from the network device, and determining the detection range from the network device as the detection range of the terminal at the control signaling detecting moment;
   wherein the detection range from the network device is determined by the network device based on the maximum channel detection capability supported by the terminal.

5. The method of claim 4, wherein obtaining the detection range from the network device comprises:
   obtaining the detection range from the network device based on at least one of a radio resource control signaling, a media access control signaling or a physical layer signaling.

6. The method of claim 1, wherein determining, based on the detection range, the resource range for detecting the control signaling transmitted by the network device on the resource location, comprises:
   determining the resource range for detecting the control signaling based on a starting position of the resource range and the detection range; wherein the starting position is determined based on pre-configured information; or the starting position is determined based on a time-frequency resource position at the control signaling detecting moment, a terminal ID and a cell ID.

7. A method for detecting a control signaling, performed by a network device, comprising:
   obtaining a maximum channel detection capability supported by a terminal and reported by the terminal;
   determining a detection range of the terminal at a control signaling detecting moment based on the maximum channel detection capability supported by the terminal;
   determining a resource location for transmitting the control signaling based on the detection range; and
   transmitting the control signaling on the resource location;
   wherein the maximum channel detection capability comprises the maximum channel detection capability supported by the terminal within a control signaling detecting duration; and the control signaling detecting duration comprises one or more control signaling detecting moments, and a total detection range of the terminal at the one or more control signaling detecting moments is less than the maximum channel detection capability supported by the terminal within the control signaling detecting duration;
   wherein determining the detection range of the terminal at a control signaling detecting moment based on the maximum channel detection capability supported by the terminal comprises:
   determining the detection range determined by the terminal based on the maximum detection capability reported by the terminal.

8. The method of claim 7, wherein the maximum channel detection capability comprises the maximum channel detection capability supported by the terminal at a single control signaling detecting moment; and
   the detection range of the terminal at the control signaling detecting moment is less than or equal to the maximum channel detection capability supported by the terminal at the single control signaling detecting moment.

9. The method of claim 7, wherein the control signaling detecting duration comprises a plurality of control signaling detecting moments; and
   detection ranges at respective control signaling detecting moments of the plurality of control signaling detecting moments are the same or different.

10. The method of claim 7, further comprising:
    transmitting the detection range to the terminal.

11. The method of claim 10, wherein transmitting the detection range to the terminal comprises:
transmitting the detection range to the terminal based on at least one of a radio resource control signaling, a media access control signaling or a physical layer signaling.

12. The method of claim 7, wherein the maximum channel detection capability comprises the maximum channel detection capability supported by the terminal at a single control signaling detecting moment and a maximum channel detection capability supported by the terminal within a control signaling detecting duration; and
the detection range of the terminal at the control signaling detecting moment is less than or equal to the maximum channel detection capability supported by the terminal at the single control signaling detecting moment and a total detection range of the terminal within the control signaling detecting duration is less than or equal to the maximum channel detection capability supported by the terminal within the control signaling detecting duration.

13. A terminal, comprising:
a processor; and
a memory for storing instructions executable by the processor;
wherein the processor is configured to:
report a maximum channel detection capability supported by the terminal to a network device, wherein the maximum channel detection capability is configured to determine by the network device a resource location for transmitting a control signaling;
determine a detection range of the terminal at a control signaling detecting moment, wherein the detection range is determined based on the maximum channel detection capability;
determine, based on the detection range, a resource range for detecting the control signaling transmitted by the network device on the resource location; and
detect within the resource range, the control signaling transmitted by the network device on the resource location;
wherein the maximum channel detection capability comprises the maximum channel detection capability supported by the terminal within a control signaling detecting duration; and the control signaling detecting duration comprises one or more control signaling detecting moments, and a total detection range of the terminal at the one or more control signaling detecting moments is less than the maximum channel detection capability supported by the terminal within the control signaling detecting duration;
wherein determining the detection range of the terminal at the control signaling detecting moment comprises:
determining the detection range determined by the terminal based on the maximum channel detection capability as the detection range of the terminal at the control signaling detecting moment.

14. A network device, comprising:
a processor; and
a memory for storing instructions executable by the processor; wherein the processor is configured to:
obtain a maximum channel detection capability supported by a terminal and reported by the terminal;
determine a detection range of the terminal at a control signaling detecting moment based on the maximum channel detection capability supported by the terminal;
determine a resource location for transmitting the control signaling based on the detection range; and
transmit the control signaling on the resource location;
wherein the maximum channel detection capability comprises the maximum channel detection capability supported by the terminal within a control signaling detecting duration; and the control signaling detecting duration comprises one or more control signaling detecting moments, and a total detection range of the terminal at the one or more control signaling detecting moments is less than the maximum channel detection capability supported by the terminal within the control signaling detecting duration;
wherein determining the detection range of the terminal at a control signaling detecting moment based on the maximum channel detection capability supported by the terminal comprises:
determining the detection range determined by the terminal based on the maximum detection capability reported by the terminal.

* * * * *